(12) United States Patent
Baca et al.

(10) Patent No.: US 10,604,277 B2
(45) Date of Patent: Mar. 31, 2020

(54) PLUGGED ACOUSTIC HONEYCOMB

(71) Applicant: Hexcel Corporation, Dublin, CA (US)

(72) Inventors: Andres Baca, Gilbert, AZ (US); Clark Smith, Phoenix, AZ (US); Earl Ayle, Chandler, AZ (US); Heather Botello, Arixona City, AZ (US)

(73) Assignee: HEXCEL CORPORATION, Dublin, CA (US)

( * ) Notice: Subject to any disclaimer, the term of this patent is extended or adjusted under 35 U.S.C. 154(b) by 295 days.

(21) Appl. No.: 15/583,059

(22) Filed: May 1, 2017

(65) Prior Publication Data

US 2018/0312278 A1   Nov. 1, 2018

(51) Int. Cl.
| | |
|---|---|
| *B64F 5/40* | (2017.01) |
| *B64D 33/02* | (2006.01) |
| *B32B 3/12* | (2006.01) |
| *G10K 11/172* | (2006.01) |
| *B29C 73/06* | (2006.01) |
| *B29C 73/26* | (2006.01) |

(52) U.S. Cl.
CPC .............. *B64F 5/40* (2017.01); *B29C 73/06* (2013.01); *B32B 3/12* (2013.01); *B64D 33/02* (2013.01); *G10K 11/172* (2013.01); *B29C 2073/264* (2013.01); *B32B 2305/024* (2013.01); *B32B 2307/102* (2013.01); *B32B 2556/00* (2013.01); *B32B 2605/18* (2013.01); *B64D 2033/0206* (2013.01)

(58) Field of Classification Search
CPC ..... B64F 5/40; B29C 73/06; B29C 2073/264; B32B 3/12; B32B 2305/024; B32B 2307/102; B32B 2556/00; B32B 2605/18; B64D 33/02; B64D 2033/0206; G10K 11/172
USPC ........................................................ 181/288
See application file for complete search history.

(56) References Cited

U.S. PATENT DOCUMENTS

| | | | | |
|---|---|---|---|---|
| 7,041,740 | B2 * | 5/2006 | Martin | ........................ C08J 5/04 264/460 |
| 7,434,659 | B2 | 10/2008 | Ayle | |
| 7,510,052 | B2 | 3/2009 | Ayle | |
| 7,854,298 | B2 | 12/2010 | Ayle | |
| 8,579,076 | B2 | 11/2013 | Ayle et al. | |
| 8,696,843 | B1 * | 4/2014 | Dean | ........................ B64F 5/40 156/98 |
| 9,200,125 | B2 * | 12/2015 | Wang | ........................ C08J 5/24 |
| 2012/0037449 | A1 | 2/2012 | Ayle | |
| 2013/0220731 | A1 * | 8/2013 | Ayle | ........................ F02C 7/045 181/222 |

(Continued)

FOREIGN PATENT DOCUMENTS

EP    1972429 A2    9/2008

*Primary Examiner* — Forrest M Phillips
(74) *Attorney, Agent, or Firm* — W. Mark Bielawski; David J. Oldenkamp

(57) ABSTRACT

An acoustic honeycomb panel is plugged with an acoustic honeycomb plug. The acoustic honeycomb plug is adhesively bonded in the panel using a honeycomb seam. The honeycomb seam is composed of a honeycomb support that is located within the seam channel and an adhesive. Using honeycomb seams to adhesively bond acoustic honeycomb plugs into acoustic honeycomb panels is useful in repairing damaged areas of acoustic honeycomb panels that are located in the acoustic treatments for jet engines.

21 Claims, 5 Drawing Sheets

(56) References Cited

U.S. PATENT DOCUMENTS

2014/0329043 A1* 11/2014 Shigetomi ............... F02C 7/045
428/63

* cited by examiner

PLUGGED ACOUSTIC HONEYCOMB

BACKGROUND OF THE INVENTION

1. Field of the Invention

The present invention relates generally to forming a plug of acoustic honeycomb in an existing acoustic honeycomb panel. The acoustic honeycomb plug is most often used to repair a damaged area of an existing panel. However, the acoustic honeycomb plug may also be used to replace a non-damaged area of the panel in order to provide desired alterations in the acoustic properties of the panel. The invention is particularly directed to methods which involve removing the damaged section of the acoustic honeycomb and inserting a replacement acoustic honeycomb section or plug in a way which limits alternations in the acoustic, properties of the repaired acoustic honeycomb. The invention is useful for repairing acoustic honeycomb panels that are used in the acoustic damping structures of jet engines.

2. Description of Related Art

It is widely recognized that the best way of dealing with excess noise generated by a specific source is to treat the noise at the source. This is typically accomplished by adding acoustic treatments to the structure at the noise source. One particularly problematic noise source is the jet engine used to propel aircraft. Acoustic treatments are typically incorporated in the engine inlet, nacelle and exhaust structures. These acoustic treatments include acoustic resonators that contain relatively thin acoustic materials or grids that have millions of holes that create acoustic impedance to the sound energy generated by the engine. The basic problem that faces engineers is how to add these thin and flexible acoustic materials into the structural elements of the jet engine and surrounding nacelle to provide desired noise attenuation.

Honeycomb has been a popular material for use in aircraft and aerospace vehicles because it is relatively strong and lightweight and each honeycomb cell can be used as an acoustic resonator. For acoustic applications, the goal has been to somehow incorporate the thin acoustic materials into the honeycomb structure so that the honeycomb cells are closed or covered. The closing of the cells with acoustic material creates the acoustic impedance upon which the resonator is based.

Forming acoustic style honeycomb into complex curved structures required for engine nacelles is a major design consideration. It is very difficult to form a single honeycomb into an engine nacelle without significantly altering the honeycomb and acoustic properties. Accordingly, numerous sections of curved or slightly curved acoustic honeycomb sections are typically spliced together to form the cylindrical nacelle structure.

The sides of the honeycomb that are spliced together are composed of numerous protruding cell walls that are typically referred to as "dog ears". The protruding cell walls that make up the dog ears have ends that present a relatively small surface area for bonding of the two honeycomb sections together. In addition, it is very difficult to position the honeycomb sections so that the ends of the dog ears on opposing honeycomb sections are lined up and close enough for bonding.

The preceding bonding/splicing issues have been typically solved b filling the seam line, and the partial cells that border the seam line, with an adhesive. The adhesive is used to completely fill all of the open spaces along the seam line to provide a solid and secure bond. For aerospace applications, the adhesive is typically a foam-type adhesive to keep the weight of the seam at a minimum. An advantage of filling the seam line and surrounding partial cells with adhesive is that the surface area of the honeycomb which is available for bonding is much larger than the surface area provided by the ends of the dog ears. A strong bond is achieved due to the relatively large surface area of honeycomb that interacts with the adhesive to form the seam. In addition, a foam-type adhesive can be used to bond together honeycomb sides that are curved and/or serpentine. Since bonding is accomplished by simply filling the seam line with adhesive, the shape and orientation of the dog ears and partial cells along the seam line can vary without affecting the overall performance of the seam.

The use of an adhesive seam line does have disadvantages. For example, the acoustic properties of the honeycomb cells that are filled with adhesive are significantly altered or destroyed. Solid adhesive seams tend to be wide and relatively heavy, which is not desirable for aerospace applications where limiting weight is an important design consideration. Also, the strength of the seam can vary depending upon the orientation of the dog ears on opposite sides of the seam line. In addition, the relatively wide adhesive seams tend to be stiff and may limit the ability to bend or otherwise shape the overall bonded honeycombs into a curved structure, such as an, engine nacelle.

One successful way of seaming acoustic honeycomb section together evolves sing an adhesive that is supported by a ribbon-shaped honeycomb support. It was discovered that narrow and strong seams could be, provided between honeycomb sections when a ribbon-shaped honeycomb support was used in combination with the adhesive. The use of honeycomb-supported adhesive seams to bond acoustic honeycomb sections together is described in U.S. Pat. No. 8,579,076 B2, the contents of which are hereby incorporated by reference. The honeycomb supported seams are much thinner than prior foam-type adhesive seams and can be used regardless of whether or not the protruding ends of the honeycomb are aligned along the seam. The thinner seams provided by the honeycomb-supported adhesive also minimize any interference with the acoustic properties of the spliced honeycomb. The honeycomb-supported adhesive seams are flexible so that they can be used to bond together curved honeycomb sections.

Acoustic honeycomb panels are sometimes damaged during manufacture or use. In order to repair the damaged section, it is necessary to remove the damaged portion of acoustic honeycomb and replace it with a plug of matching acoustic honeycomb that is bonded in place. Many of the same issues involved in seaming honeycomb sections together, as discussed above, are also presented when locating and bonding a plug of acoustic honeycomb in the hole formed when the damaged honeycomb has been removed. A number of other complex issues are also presented due to the fact that the acoustic honeycomb plug has to be inserted into the damaged panel rather than being bonded to an exposed edge of the acoustic honeycomb. In addition, the insertion and bonding of the acoustic honeycomb plug must be accomplished while keeping in mind that the acoustic properties of the repaired acoustic honeycomb panel should match the acoustic properties of the original non-damaged acoustic honeycomb panel.

SUMMARY OF THE INVENTION

In accordance with the present invention, it was discovered that a honeycomb supported adhesive seam may be used to bond an acoustic honeycomb plug into a hole located in an existing acoustic honeycomb. The honeycomb supported adhesive seam was found to be effective in filling the seam channel that is formed between the acoustic honeycomb plug and the acoustic honeycomb panel to provide a secure bond with rout adversely altering the acoustic properties of the plugged acoustic honeycomb panel.

The present invention provides a method for plugging an acoustic honeycomb panel that has a first panel edge and a second panel edge. The acoustic honeycomb panel includes a plurality of panel walls that extend between the first and second panel edges. The panel walls form a plurality of panel honeycomb cells where each of the panel honeycomb cells has a cross-sectional area measured perpendicular to the panel walls and a panel depth defined by the distance between the first and second panel edges. The acoustic honeycomb panel also includes acoustic septa located within the panel honeycomb cells. The acoustic honeycomb panel includes a hole extending between the first and second panel edges. The hole is formed by removing honeycomb that has been damaged or by removing non-damaged acoustic honeycomb that requires replacing due to desired changes in panel acoustic properties or for any other reason. The hole has a boundary formed by the walls of the panel that surround the hole.

The method of the present invention also involves providing an acoustic honeycomb plug that has a first plug edge and a second plug edge. The acoustic honeycomb plug includes a plurality of walls that extend between the first and second plug edges to form a plurality of plug honeycomb cells where each of the plug honeycomb cells has a cross-sectional area measured perpendicular to the walls and a plug depth defined by the distance between said first and second plug edges. The acoustic honeycomb plug also includes acoustic septa located within the plug honeycomb cells. The acoustic honeycomb plug has a plug perimeter that is formed by the walls the plug honeycomb cells that are located along the plug perimeter.

The method of the present invention further involves locating the acoustic honeycomb plug within the panel hole so as to form a seam channel having a channel width defined by the distance between the plug perimeter and the hole boundary. The seam channel has a channel depth defined by the plug depth at the plug perimeter and the panel depth at the hole boundary. The seam channel also has a channel circumference.

As a feature of the method of present invention, a honeycomb seam is located in the seam channel to adhesively bond the acoustic honeycomb panel to the acoustic honeycomb plug. The honeycomb seam is composed of a honeycomb support that is in the shape of a ribbon having a thickness that is the distance between a first support edge and a second support edge. The honeycomb support has a support width which is the distance between a first support side and a second support side. The honeycomb support also has a circumference. The support thickness, support width and support circumference are such that said honeycomb support is located within the seam channel. The honeycomb support has a plurality of support walls that extend between the first and second support edges. The support walls form a plurality of support honeycomb cells where each of the support honeycomb cells has a cross-sectional area measured perpendicular to the support walls. The honeycomb seam also includes an adhesive located in the support honeycomb cells. The adhesive is present in an amount that is sufficient to fill the seam channel and thereby bond the plug perimeter to the panel boundary.

As a feature of the invention, the honeycomb seam can first be located on the plug perimeter to form a seam coated acoustic honeycomb plug that is then located in the panel hole. As a further feature of the invention, the adhesive is maintained in a tacky state during application of the honeycomb seam to the acoustic honeycomb plug to ensure that the honeycomb seam is adhered to the plug perimeter. The seam coated acoustic honeycomb plug is then treated, typically by cooling, so that the adhesive is no longer tacky. The tack-free seam coated acoustic honeycomb plug is then inserted into the panel hole where it is allowed to return to its tacky state to ensure adherence of the plug within the panel. The adhesive is then further heated, if necessary, for curing and final seam bond formation.

The present invention covers methods for repairing damaged acoustic honeycomb panels in which the damaged portions of the acoustic honeycomb panel are removed and replaced with the acoustic honeycomb plug. The invention is particularly useful in repairing damaged acoustic honeycomb panels that are used as acoustic treatments in jet engines.

The present invention also covers the repaired or altered acoustic panels that include a honeycomb panel into which an acoustic honeycomb plug has been inserted and bonded using a honeycomb supported adhesive seam.

The above described and many other features and attendant advantages of the present invention will become better understood by reference to the following detailed description when taken in conjunction with the accompanying drawings.

DETAILED DESCRIPTION OF THE INVENTION

The present invention may be used to form acoustic honeycomb plugs in a wide variety of complex acoustic honeycomb panel types and shapes. The following detailed description is directed to repairing the damaged area in an acoustic honeycomb panel of the type found in the nacelles and other sound damping structures present in large aircraft jet engines. This is a preferred use for the invention. However, it will be understood that the invention is also applicable to plugging holes in acoustic honeycomb panels with an acoustic honeycomb plug regardless of the reason for which the hole was made.

Figure 2:
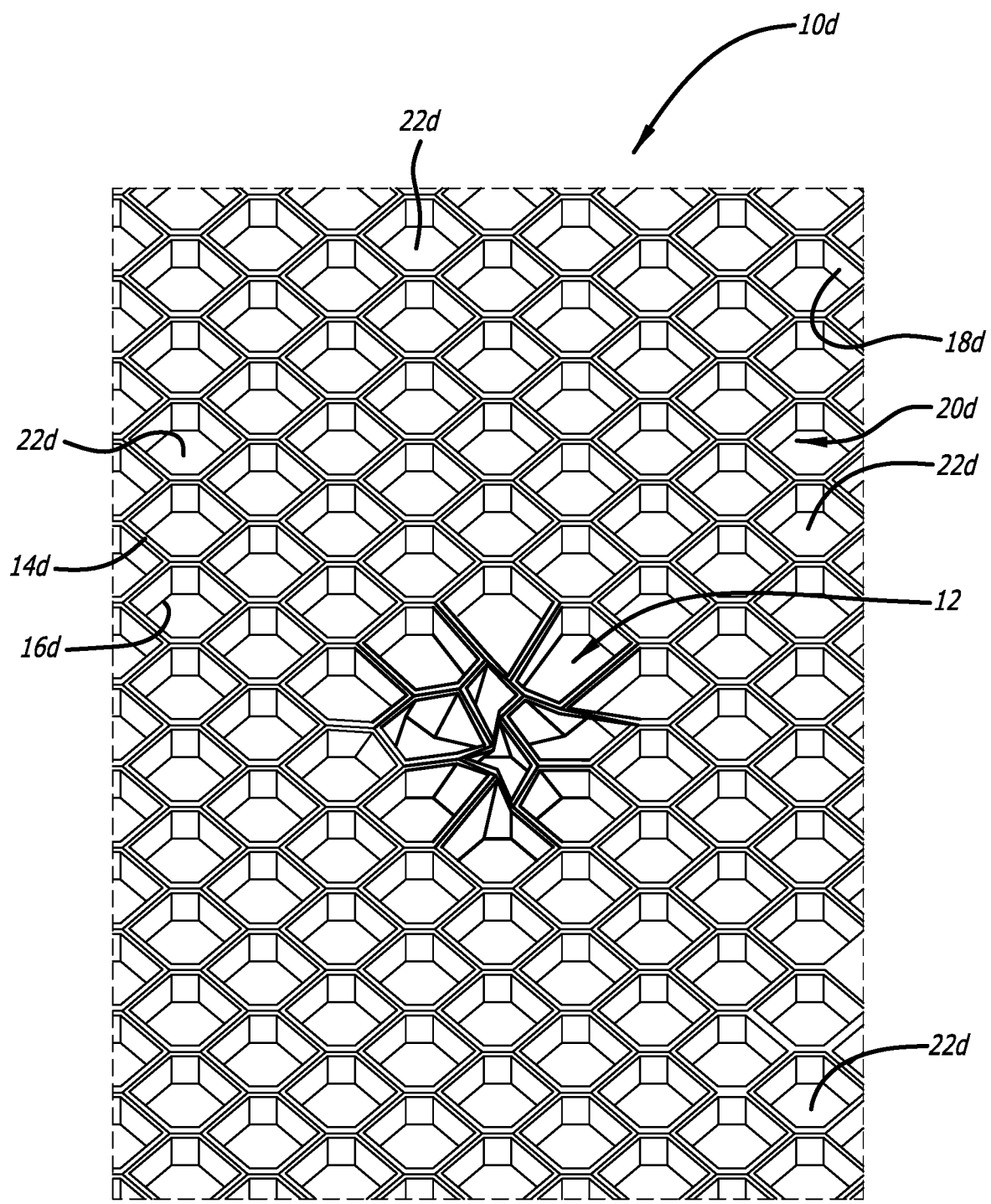
FIG. 2 shows a damaged acoustic honeycomb panel prior to the damaged area being removed.

A damaged acoustic honeycomb panel from the nacelle of a large jet engine is shown generally at 10*d* in FIG. 2. The damaged acoustic honeycomb panel 10*d* has a damaged area or section shown at 12. The damaged acoustic honeycomb panel 10*d* can be made from any of the conventional materials used in making honeycomb panels including metals, ceramics and composite materials. Exemplary metals include aluminum and aluminum alloys. Exemplary composites include aramid fibers, such as Nomex®, carbon fibers, glass fibers and ceramic fibers and various combinations of these fibers with a suitable matrix resin. Exemplary matrix resins include thermosetting or thermoplastic resins where the thermosetting resin may or may not be toughened with a thermoplastic resin.

The damaged acoustic honeycomb panel 10*d* has a first panel edge 14*d* and a second panel edge 16*d*. The damaged acoustic honeycomb panel 10*d* includes panel walls 18*d* that extend between the two panel edges 14*d* and 16*d* to define a plurality of panel honeycomb cells 20*d*. Each panel honeycomb cell 20*d* has a cross-sectional area that is measured perpendicular to the cell walls 18*d*. The depth or thickness of the damaged acoustic honeycomb panel 10*d* is the distance between the first panel edge 14*d* and the second panel edge 16*d*.

The damaged acoustic honeycomb panel 10*d* includes acoustic septa 22*d* that are shown being located in all of the panel honeycomb cells 20*d*. Acoustic septa do not have to present in all panel honeycomb cells 20*d* and some cells may include more than one septa. Although any type of acoustic septum may be used, it is preferred that septa be the type of septum caps described in detail in U.S. Pat. Nos. 7,434,659; 7,510,052 and 7,854,298, the contents of which is hereby incorporated by reference. These types of septa are preferred because they are relatively flexible and retain their acoustic absorption properties when the acoustic honeycomb panel is in the form of a curved (non-planar) structure, such as the acoustic honeycomb panel sections that present in jet engine nacelles.

Any of the acoustic materials typically used in acoustic honeycomb panels may be used to form the septa 22*d*. Acoustic materials are typically provided as relatively thin sheets that are perforated, porous or an open mesh fabric that is designed to provide noise attenuation. Perforated and porous sheets of various materials (metals, ceramics and plastics) may be used. In one preferred embodiment the acoustic material is an open mesh fabric that is woven from monofilament fibers. The fibers may be composed of glass, carbon, ceramic or polymers. Monofilament polymer fibers made from polyamide, polyester, polyethylene chlorotrifluoroethylene (ECTFE), ethylene tetrafluoroethylene (ETFE), polytetrafluoroethylene (PTFE), polyphenylene sulfide (PPS), polyfluoroethylene propylene (FEP), polyether ether ketone (PEEK), polyamide 6 (Nylon, 6 PA6) and polyamide 12 (Nylon 12, PA12) are just a few examples. Open mesh fabric made from PEEK is preferred for high temperature applications. Open mesh acoustic fabrics are available from a wide variety of commercial sources. For example, sheets of open mesh acoustic fabric may be obtained from SEFAR America. Inc. (Buffalo Division Headquarters 111 Calumet Street Depew, N.Y. 14043 under the trade names SEFAR PETEX, SEFAR NITEX and SEFAR PEEKTEX.

Solid sheets of acoustic material can also be used to form the septa 22*d*. In this case, perforations are formed in the solid sheet material either before or after the septa are placed within the honeycomb cell. Although metals, ceramics and plastics of the type identified above may be, used to make perforated septa, it is preferred that the acoustic material be PEEK or a similar chemically resistant polymer material that is suitable for high temperature applications. Sheets or films of PEEK are available commercially from a number of sources, such as Victrex USA (Greenville, S.C.) which produces sheets of PEEK under the tradename VICTREX® PEEK™ polymer. Additional details regarding septum caps and their use in acoustic honeycombs are provided in published U.S. Patent Application No. 2012-0037449-A1, the contents of which is hereby incorporated by reference.

Figure 3:
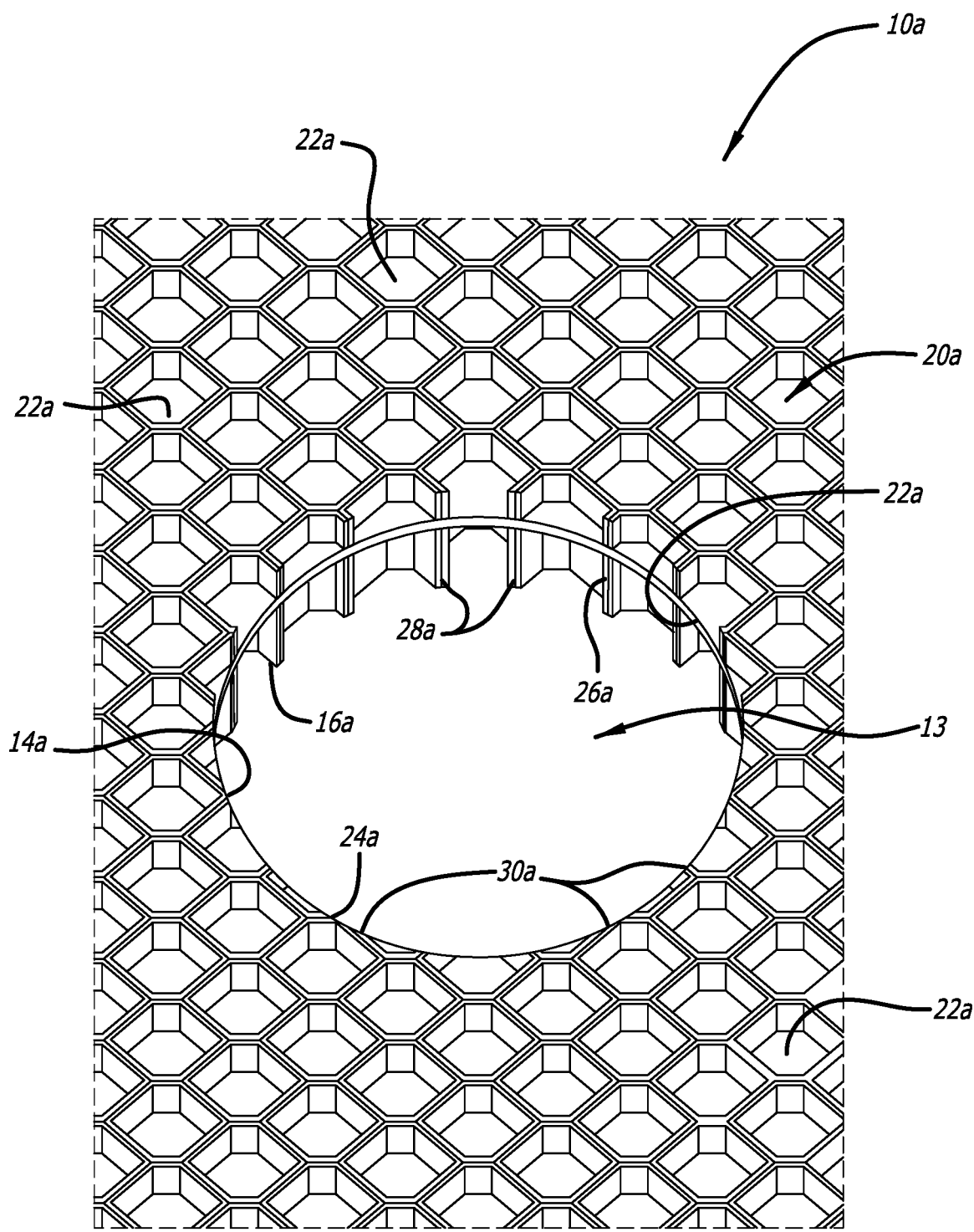
FIG. 3 shows the damaged acoustic honeycomb panel after the damaged area has been removed.

The damaged area 12 of the acoustic honeycomb panel 10*d* is removed to form the acoustic honeycomb panel shown at 10*a* in FIG. 3. The acoustic honeycomb panel 10*a* is the same as the damaged acoustic honeycomb panel 10*d*, except that the damaged area 12 has been removed to form a hole 13. Accordingly, the numbers identifying the elements of the acoustic honeycomb panel 10*a* as shown in FIG. 3 are the same as in FIG. 2, except that "d" has been replaced with "a" to show that the two panels are the same, except for the removal of the damaged area 12 and formation of hole 13.

The damaged honeycomb area 12 is removed by any of the known procedures for removing damaged honeycomb from an acoustic honeycomb panel. The removal method will depend upon the particular honeycomb material. Removal is typically accomplished by mechanical means, such as cutting or machining operations. However, thermal removal methods, such as laser cutting, may be used. Chemical removal methods are also possible depending upon the type of honeycomb material.

The hole 13 extends between the first edge 14*a* and second edge 16*a* of the acoustic honeycomb panel 10*a*. The hole 13 has a boundary 24*a* that is formed by the walls 26*a* of the portion of the acoustic honeycomb panel 10*a* that surrounds the hole 13. The hole 13 is shown as a circular cylinder that is formed by a circular boundary 24*a*. Holes with circular boundaries are preferred. However, the hole boundary 24*a* may be other shapes depending upon the damaged area being removed and the shape of the acoustic honeycomb panel in the damaged area. For example, the hole boundary 24*a* may be square shaped, rectangular or other polygonal shape. The shape of the hole boundary 24*a* may also be irregular depending upon the size and shape of the damaged area.

The hole boundary 24*a* is formed by end portions of the boundary walls 26*a* as shown at 28*a*. The hole boundary 24*a* is also formed by side portions of the boundary walls 26*a* as shown at 30*a*. As can be seen from FIG. 3, a complex combination of boundary wall side portions 30*a* and end portions 28*a* form the hole boundary 24*a*. This complex combination of side portions and end portions will, vary depending upon the size, shape and location of the hole 13 within the acoustic honeycomb panel 10*a*, as well as the particular acoustic honeycomb panel that is being repaired. It is preferred that the hole boundary be smooth and uniform in order to allow unhindered insertion of the acoustic honeycomb plug. Accordingly, any burrs or irregularities in the end or side portions of the boundary walls, which may occur during removal of the damaged area, should be removed, if possible.

Figure 4:
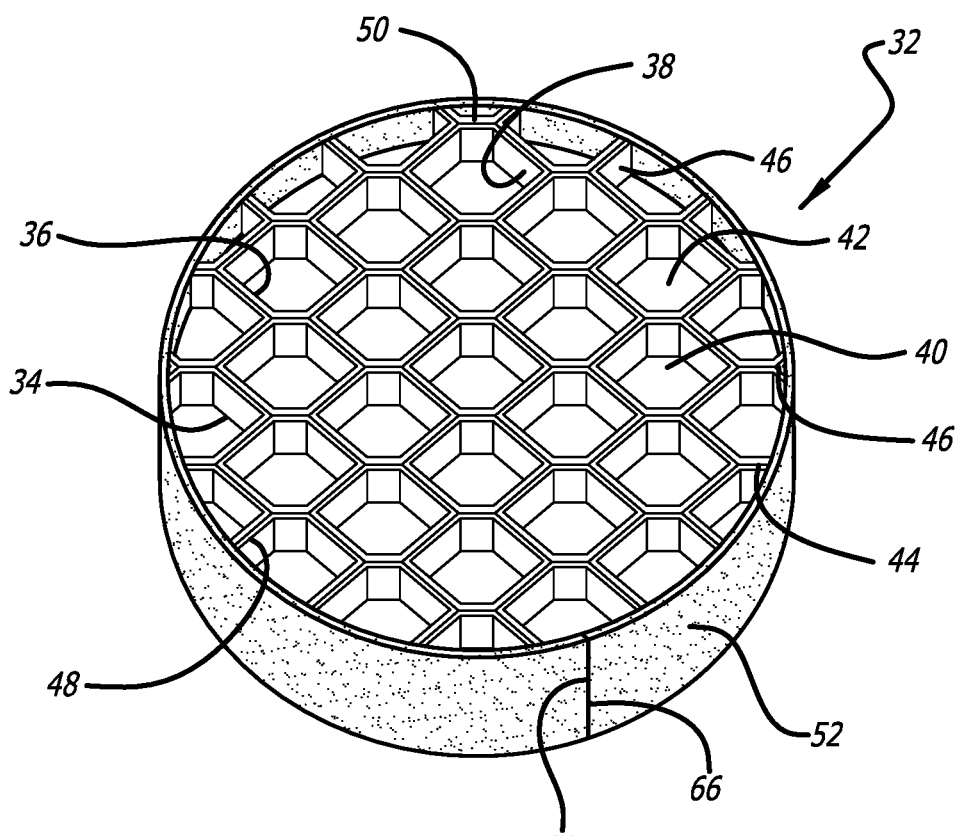
FIG. 4 shows a seam coated acoustic honeycomb plug in which the honeycomb seam has been adhered to the perimeter of the acoustic honeycomb plug.

An exemplary acoustic honeycomb plug is Shown at 32 in FIG. 4. The acoustic honeycomb plug 32 has a first plug edge 34 and a second plug edge 36. The acoustic honeycomb plug 32 includes a plurality of plug walls 38 that extend between the first and second plug edges. The walls 38 define a plurality of plug honeycomb cells 40 which each has a cross-sectional area measured perpendicular to the plug walls 38. The plug depth or thickness is the distance between the first plug edge 34 and the second plug edge 36.

The acoustic honeycomb plug 32 includes septa 42 that are shown being located in all of the plug honeycomb cells 40. Acoustic septa do not have to present in all plug honeycomb cells 40 and some cells may include more than one septa. Although any type of acoustic septum may be used in the same manner as the acoustic septa present in the acoustic honeycomb panel 10a. It is preferred, especially when repairing a damaged area, that the acoustic septa type and configuration in the acoustic honeycomb plug match the acoustic septa type and configuration of the acoustic honeycomb panel so that the acoustic properties of the original non-damaged acoustic honeycomb panel remain unchanged. However, the acoustic septa type and configuration may be varied widely when the acoustic honeycomb plug is being used to intentionally alter the acoustic properties of a non-damaged acoustic honeycomb panel.

The acoustic honeycomb plug 32 has a plug perimeter 44 that is formed by those portions 46 of the plug walls that are located along the plug perimeter 44. In a manner similar to the panel boundary 24a, the portions 46 of the plug wall that form the plug perimeter 44 may include a complex combination of end portions 48 and side portions 50. This complex combination of side portions and end portions that make up the plug perimeter will also vary depending upon the size, shape and location of the hole 13 that is being plugged 10a, as well as the particular acoustic honeycomb that is being used for the plug material. It is preferred that the plug perimeter be smooth and uniform in order to allow unhindered insertion of the acoustic honeycomb plug into hole 13. Accordingly, any burrs or irregularities in the end or side portions that form the plug perimeter, which may occur during formation of the plug, should be removed, if possible.

The acoustic honeycomb plug 32 is formed in the same manner as the damaged area is removed from the existing acoustic honeycomb panel 10d. When repairing a damaged panel to restore original acoustic properties, a plug that matches the size and shape of the hole 13 is mechanically, thermally or chemically removed from an undamaged acoustic honeycomb panel that has acoustic, physical and dimensional properties which match the damaged panel lad.

Figure 5:
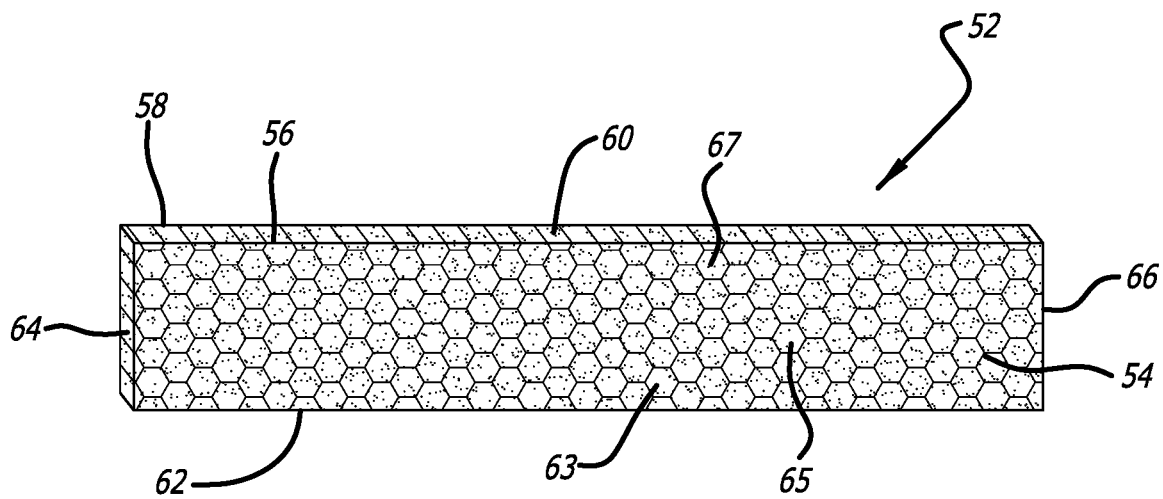
FIG. 5 shows an exemplary honeycomb seam prior to it being applied either to the perimeter of the acoustic honeycomb plug or to the boundary of the hole in the damaged acoustic honeycomb panel.

The acoustic honeycomb plug 32 is S110 as a seam coated acoustic honeycomb plug in which a honeycomb seam 52 has been attached to the plug 32 along the plug perimeter 44. The honeycomb seam 52 is shown in FIG. 5 prior to the honeycomb seam being wrapped around the plug perimeter 44.

The honeycomb seam 52 includes a honeycomb support 54 that is in the shape of a ribbon having a thickness which is the distance between a first support edge 56 and a second support edge 58. The honeycomb support 54 has a width which is the distance between a first support side 60 and a second support side 62. The honeycomb support 54 includes a plurality of support walls 63 that extend between the first support edge 56 and second support edge 58. The support walls 63 form a plurality of support honeycomb cells 65 which each has a cross-sectional area measured perpendicular to the support walls 63. The support honeycomb cells are filled with an adhesive 67 that is present in a sufficient amount to provide bonding of the acoustic honeycomb plug 32 to the hole boundary 24a of acoustic honeycomb panel 10a.

The honeycomb seam 52 has a head end 64 and a tail end 66 with the length of the honeycomb seam being the distance between the head end 64 and tail end 66. The length of the honeycomb seam matches the circumference of the plug perimeter so that the head end 64 and tail end 66 are located next to or adjacent each other when the honeycomb seam is applied to the plug perimeter as shown in FIG. 4 to form a cylindrical seam. Multiple segments of honeycomb seam may be used to form a single seam, if desired. Multiple honeycomb seam segments may be required when the size of the hole being repaired is relatively large. In general, however, it is preferred that the honeycomb seam be formed from a single segment or piece of honeycomb support.

The material used to make the honeycomb support 54 can be any of the same materials that are used to make the acoustic honeycomb panels. The material should be sufficiently thin so that it can be flexed to provide enough flexibility for wrapping around the plug perimeter to form a cylindrical seam. It is preferred that the honeycomb support material be the same as that used in making the acoustic honeycomb panel and acoustic honeycomb plug. The thickness of the material used to form the honeycomb support can be varied with it being preferred that the material be as thin as possible while still providing necessary support to the adhesive.

The adhesive 67 can be any suitable adhesive that is typically used in connection with the fabrication of honeycomb panels. The same adhesives that are used to bond the septa within the honeycomb cells are generally also suitable for use as the seam adhesive. Preferred adhesives include those that are stable at high temperature (300-400° F.). Exemplary adhesives include epoxies, acrylics, phenolics, cyanoacrylates, bismaleimides, polyamide-imides, and polyimides. Polyamide-imide adhesives are particularly preferred. The honeycomb support 54 structure is preferably loaded with the desired adhesive so that the adhesive fills substantially all of the cells in the honeycomb support structure and coats the edges of the honeycomb support structure. The adhesive may extend somewhat past the edges of the honeycomb support 54, if desired.

Figure 6:
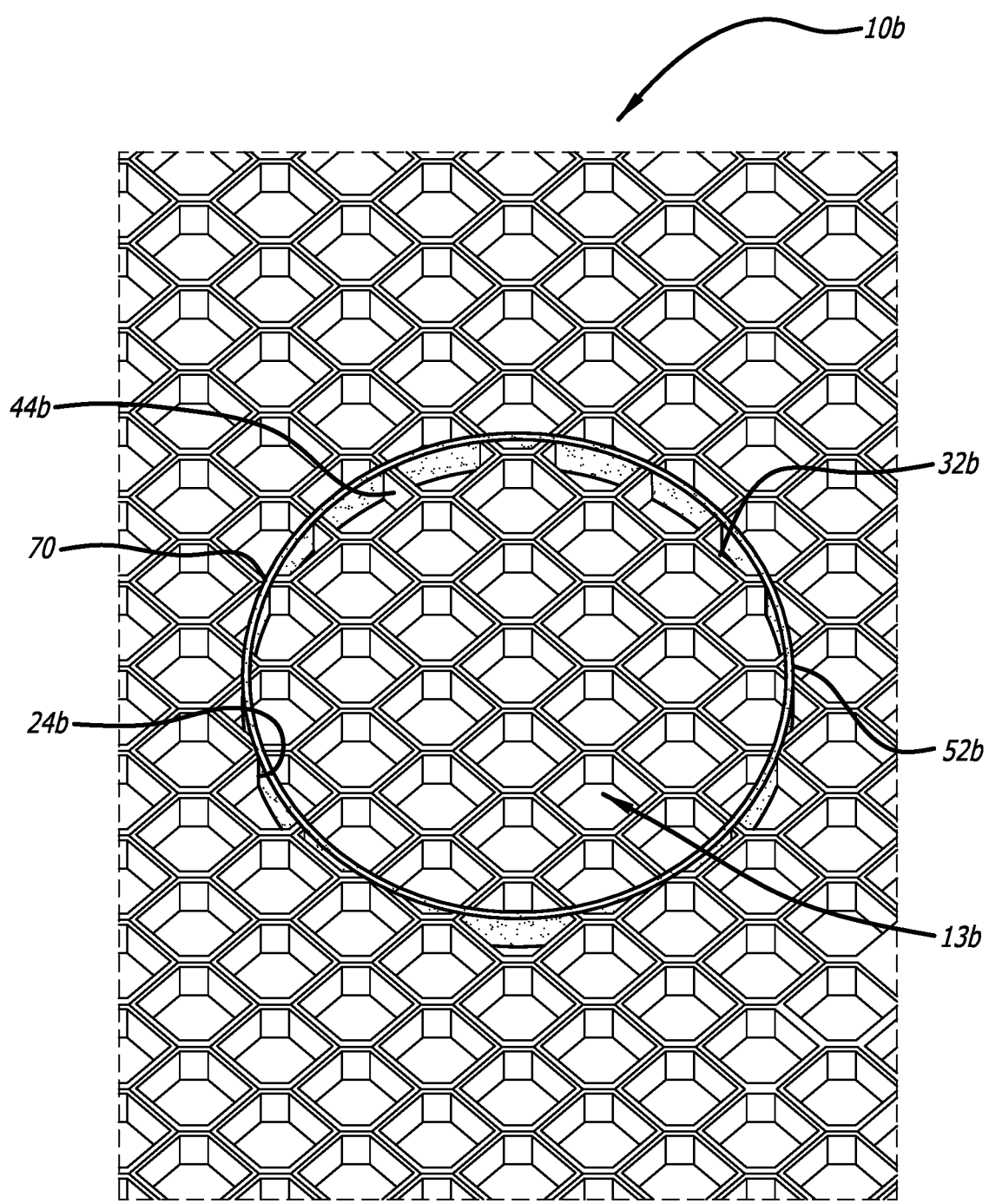
FIG. 6 shows the seam coated acoustic honeycomb plug located the acoustic honeycomb panel prior to curing of the adhesive to form the repaired acoustic honeycomb panel shown in FIG. 1.

FIG. 6 shows the acoustic honeycomb plug 32b after it has been inserted into hole 13b of panel 10b. The honeycomb seam 52b is shown in place within the seam channel 70 that is located between the hole boundary 24b and plug perimeter 44b. The numbers identifying the elements of the acoustic honeycomb panel 10b, as shown in FIG. 6, are the same as in FIGS. 3 and 4, except that "b" has been added. This shows that the acoustic honeycomb panels and seam coated acoustic honeycomb plugs remain the same after they are combined to form the plugged acoustic honeycomb panel 10b.

The respective sizes of the plug perimeter 44b and hole boundary 24b are chosen so that a seam channel 70 is formed between the panel and plug. The seam channel 70 has a width which is the distance between the plug perimeter 44b and the hole boundary 24b. The depth of the seam channel 70 is equal to the plug depth at the plug perimeter 44b and the panel depth at the hole boundary 24b. It is preferred that the plug depth and panel depths are the same. The seam channel 70 also has a circumference that is determined by the plug perimeter circumference 44b and hole boundary 24b.

The seam channel width and honeycomb seam thickness are chosen so that the acoustic honeycomb plug 32b can be inserted into acoustic honeycomb panel 10b, as shown in FIG. 6. It is preferred that the width of the seam channel is slightly larger than the thickness, of the honeycomb seam. The difference between the seam channel width and the honeycomb seam thickness should be as, small as possible to provide adequate bonding of the adhesive. At the same time, this difference must also be large enough to allow the acoustic honeycomb plug to be inserted into position within the acoustic honeycomb panel without undue interference or premature seizing between the acoustic honeycomb plug, acoustic honeycomb panel and/or the honeycomb seam.

Once the acoustic honeycomb plug has been inserted into position, the adhesive is cured or otherwise allowed to set up in order to provide a repaired acoustic honeycomb panel. A repaired acoustic honeycomb panel is shown at 10c in FIG. 1. The repaired acoustic honeycomb panel 10c includes the acoustic honeycomb plug 32c which is securely and permanently bonded within the repaired acoustic honeycomb panel 10c by way of the cured honeycomb seam 52c. The numbers identifying the elements of the repaired acoustic honeycomb panel 10c are the same as in FIGS. 3, 4 and 6, except that "c" has been added. This shows that the acoustic honeycomb panels and seam coated acoustic honeycomb plugs remain the same after they are combined to form the repaired acoustic honeycomb panel 10c, except for the honeycomb seam 52c being cured or otherwise set to form a permanent bond between the acoustic honeycomb panel 10c and acoustic honeycomb plug 32c.

The honeycomb seam 52 is preferably located either on the plug perimeter 44 or hole boundary 24a prior to insertion of the acoustic honeycomb plug 32 into the acoustic honeycomb panel 10a. Many of the suitable adhesives are inherently tacky or sticky at room temperature (20° C. to 25° C.) or when heated to a particular softening temperature. It is preferred that the honeycomb seam be applied to the plug perimeter or hole boundary and pressed in place while the adhesive is tacky. The inherent tack of the adhesive holds the honeycomb seam in place during insertion of the acoustic honeycomb plug into the acoustic honeycomb panel.

The complexities of the shapes of the honeycomb walls along the plug perimeter and the hole boundary, as well as the respective sizes of the seam channel width and honeycomb seam thickness being close to each other, make it difficult to insert the acoustic honeycomb plug into the acoustic honeycomb panel without there being some contact of the adhesive with either the plug perimeter, when the seam is located in the acoustic honeycomb panel, or the hole boundary, when the seam is located on the plug perimeter. Such adhesive contact is preferably avoided since it can cause premature adhesion and seizing of the acoustic honeycomb plug within the hole before the plug, reaches the desired position within the acoustic honeycomb panel.

Figure 1:
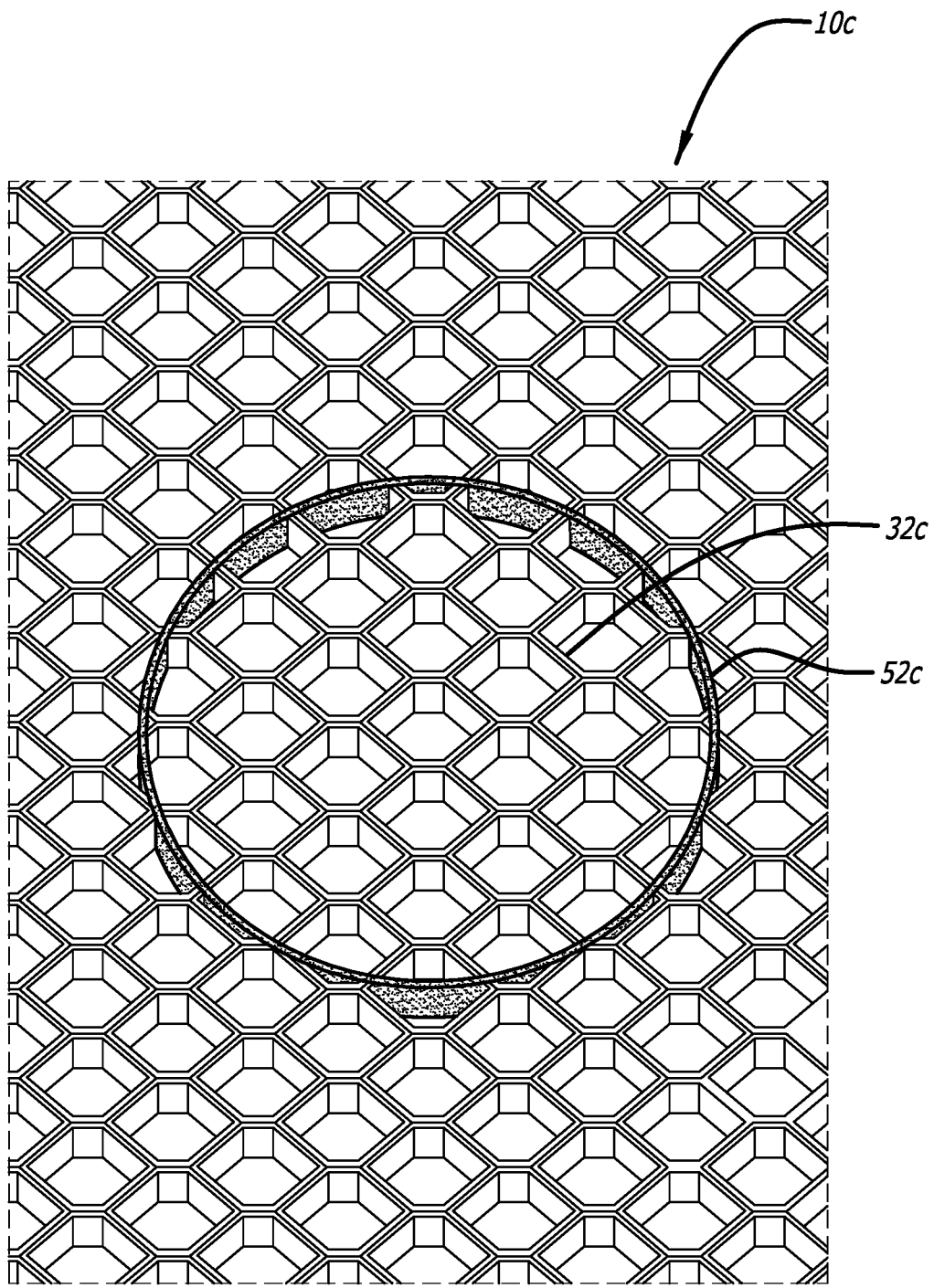
FIG. 1 shows a repaired acoustic honeycomb panel in which an acoustic honeycomb plug has been inserted into the panel and bonded in place using a honeycomb seam in accordance with the present invention.

In order to eliminate the problem associated with a tacky adhesive causing premature adhesion of the acoustic honeycomb plug, it is preferred that the adhesive be cooled or otherwise treated so that it is not tacky when the acoustic honeycomb plug is inserted into the hole. Keeping the adhesive in a non-tacky state eliminates the problems associated with premature adhesion of the acoustic honeycomb plug during insertion into the acoustic honeycomb panel. Once in place within the acoustic honeycomb panel, the adhesive is allowed to return to its tacky state to provide temporary adherence of the acoustic honeycomb plug perimeter to the hole boundary of the acoustic honeycomb panel, as shown in FIG. 6. The adhesive is then heated or otherwise treated to cure or set the adhesive to form the final repaired panel, as shown in FIG. 1.

Polyamide-imide adhesives are preferred as the honeycomb seam adhesive. These adhesives are inherently tacky at room temperature. In a preferred embodiment, a honeycomb seam containing a polyamide-imide adhesive is applied to the perimeter of an acoustic honeycomb plug at room temperature and adhered in place using slight pressure to form a seam coated acoustic honeycomb plug. The seam coated acoustic honeycomb plug is then cooled to a temperature of 0° C. or less so that the adhesive is no longer tacky. Cooling to a temperature of 0° C. is preferred. The seam coated adhesive plug is maintained at the cooled temperature during insertion into the acoustic honeycomb panel. The seam coated adhesive plug is then allowed to return to room temperature so that the adhesive regains its inherent tackiness to provide temporary adherence of the seam coated adhesive plug to the acoustic, honeycomb panel. The adhesive is then heated to a temperature of 177° C. for 60 minutes in order to cure the polyamide-imide adhesive and permanently bond the acoustic honeycomb plug within the acoustic honeycomb panel.

The acoustic honeycomb panels that can be repaired using the acoustic honeycomb plugs of the present invention can vary widely in cell cross-sectional area, wall thickness and depth. Typical acoustic honeycomb panels will have cells with cross-sectional areas ranging from 0.05 square inch to 1 square inch or more. The wall thicknesses of the honeycomb material will typically range from 0.001 to 0.050 inch. The depth of the cells (core thickness) ranges from 0.25 to 3 inches or more. Exemplary acoustic honeycomb panels for repair that are used in the jet engines of large aircraft will typically have hexagonal cells that have a cross-sectional area of around 0.1 to 0.5 square inch, wall thicknesses of around 0.025 to 0.05 inch and a depth of around 1.0 to 2.0 inches.

The seam channel dimension will vary depending upon the dimensions and shape of the acoustic honeycomb panel being repaired or altered, the size and shape of the acoustic honeycomb plug and the size and shape of the honeycomb seam. Typically, the seam channels will have a channel width of from 0.35 to 0.50 inch. Preferred seam channel thicknesses for use in repairing acoustic honeycomb panels found in the jet engines of large aircraft are from 0.060 to 0.100 inch. The depth of the seam channel will typically range from 0.25 inch to 3 inches or more. Preferred seam channel depths for use in repairing acoustic honeycomb panels found in the jet engines of large aircraft are from 1 to 2 inches. The circumference of the seam channel will depend upon the size of the hole being plugged and the size of the acoustic honeycomb plug. Typical seam channel circumferences will range front a minimum of 10 inches to much larger circumferences depending upon the size of the damaged area. It was found that 10 inches is the minimum circumference of the seam channel that is required when repairing acoustic honeycomb panels found in the jet engines of large aircraft.

The honeycomb seam should have an overall thickness, which includes the honeycomb support and adhesive, which is from 0.025 to 0.050 inch less than the width of the seam channel. The adhesive will preferably extend slightly past the first and second support edges of the honeycomb support. The preferred thickness of the adhesive extending out past the first and second support edges is on the order of 0.005 to 0.010 inch. The thickness of the honeycomb seam is preferably from 0.025 to 0.050 inch less than the seam channel width when repairing damaged areas of acoustic honeycomb panels found in the jet engines of large aircraft that require a seam channel having dimensions that fall within the ranges set forth above.

Having thus described exemplary embodiments of the present invention, it should be noted by those skilled in the art that the within disclosures are exemplary only and that various other alternatives adaptations and modifications may be made within the scope of the present invention. Accordingly, the present invention is not limited by the above-described embodiments, but is only limited by the following claims.

What is claimed is:

1. A method for plugging an acoustic honeycomb panel, said method comprising the steps of:
   A) providing an acoustic honeycomb panel comprising a first panel edge and a second panel edge, said acoustic honeycomb panel further comprising a plurality of panel walls that extend between said first and second panel edges, said panel walls defining a plurality of panel acoustic honeycomb cells wherein each of said panel acoustic honeycomb cells has a cross-sectional area measured perpendicular to said panel walls and a panel depth defined by the distance between the first and second panel edges, said acoustic honeycomb panel further comprising acoustic septa located within said plurality of panel acoustic honeycomb cells, said acoustic honeycomb panel comprising a plurality of boundary walls having end portions which surround a hole extending between the first and second panel edges, said hole having a boundary defined by the end portions of said boundary walls;
   B) providing an acoustic honeycomb plug comprising a first plug edge and a second plug edge, said acoustic honeycomb plug further comprising a plurality of plug walls that extend between said first and second plug edges, said plug walls defining a plurality of plug acoustic honeycomb cells wherein each of said plug acoustic honeycomb cells has a cross-sectional area measured perpendicular to said plug walls and a plug depth defined by the distance between said first and second plug edges, said acoustic honeycomb plug further comprising acoustic septa located within said plurality of plug acoustic honeycomb cells, said acoustic honeycomb plug comprising a plurality of plug perimeter walls having end portions which form a plug perimeter that is defined by said end portions of the plug perimeter walls;
   C) locating said acoustic honeycomb plug within said hole so that said boundary walls and perimeter walls do not contact each other so as to form an open seam channel which is free of said boundary walls and perimeter walls, said open seam channel having a channel width defined by the distance between said plug perimeter and said hole boundary, a channel depth defined by the plug depth at said plug perimeter and the panel depth at said hole boundary and a channel circumference;
   D) locating a honeycomb seam in said open seam channel to adhesively bond said acoustic honeycomb panel to said acoustic honeycomb plug, said honeycomb seam comprising:
      a) a honeycomb support that is in the shape of a ribbon having a support thickness defined by the distance between a first support edge and a second support edge, a support width defined by the distance between a first support side and a second support side and a support circumference wherein the support thickness, support width and support circumference are such that said honeycomb support is located within said open seam channel, said honeycomb support comprising a plurality of support walls that extend between said first and second support edges, said support walls defining a plurality of support honeycomb cells wherein each of said support honeycomb cells has a cross-sectional area measured perpendicular to said support walls; and
      b) an adhesive located in said support honeycomb cells, said adhesive being present in an amount that is sufficient to fill said open seam channel and thereby bond said plug perimeter to said panel boundary.

2. A method for plugging an acoustic honeycomb panel according to claim 1 wherein said honeycomb seam is located on said plug perimeter to form a seam coated acoustic honeycomb plug that is then located in said hole.

3. A method for plugging an acoustic honeycomb panel according to claim 2 wherein said adhesive is tacky when said honeycomb seam is located on said plug perimeter to form said seam coated acoustic honeycomb plug and wherein said seam coated acoustic honeycomb plug is treated so that said adhesive is not tacky when said seam coated acoustic honeycomb plug is located in said hole.

4. A method for plugging an acoustic honeycomb panel according to claim 3 wherein said seam coated acoustic honeycomb plug is treated by cooling to a temperature at which said adhesive is not tacky.

5. A method for plugging an acoustic honeycomb panel according to claim 1 wherein said honeycomb seam is a single of ribbon having a head end and a tail end wherein said head end and tail end are located next to each other.

6. A method for plugging an acoustic honeycomb panel according to claim 1 wherein said adhesive is a polyamide-imide adhesive.

7. A method for plugging an acoustic honeycomb panel according to claim 6 wherein said acoustic honeycomb panel is made from a composite material.

8. A method for plugging an acoustic honeycomb panel according to claim 1 wherein the open seam channel width is from 0.35 inch to 0.50 inch.

9. A method for plugging an acoustic honeycomb panel according to claim 1 wherein the open seam channel depth is from 0.25 inch to 3 inches.

10. A method for plugging an acoustic honeycomb panel according to claim 1 wherein the open seam channel circumference is at least 10 inches.

11. A method for plugging an acoustic honeycomb panel according to claim 1 wherein said acoustic honeycomb panel forms part of an acoustic treatment for a jet engine.

12. A method for repairing a damaged acoustic honeycomb panel, said repair method comprising the steps of:
   A) providing an acoustic honeycomb panel comprising a first panel edge and a second panel edge, said acoustic honeycomb panel further comprising a plurality of panel walls that extend between said first and second panel edges, said panel walls defining a plurality of panel acoustic honeycomb cells wherein each of said panel acoustic honeycomb cells has a cross-sectional area measured perpendicular to said panel walls and a panel depth defined by the distance between the first and second panel edges, said acoustic honeycomb panel further comprising acoustic septa located within said plurality of panel acoustic honeycomb cells, said acoustic honeycomb panel comprising a damaged area;
   B) removing said damaged area to form a plurality of boundary walls having end portions which surround a hole extending between the first and second panel edges, said hole having a boundary defined by the end portions of said boundary walls;
   C) providing an acoustic honeycomb plug comprising a first plug edge and a second plug edge, said acoustic honeycomb plug further comprising a plurality of plug walls that extend between said first and second plug edges of, said plug walls defining a plurality of plug acoustic honeycomb cells wherein each of said plug acoustic honeycomb cells has a cross-sectional area measured perpendicular to said plug walls and a plug depth defined by the distance between said first and second plug edges, said acoustic honeycomb plug further comprising acoustic septa located within said plurality of plug acoustic honeycomb cells, said acoustic honeycomb plug comprising a plurality of plug perimeter walls having end portions which form a plug perimeter that is defined by said end portions of the plug perimeter walls;

D) locating said acoustic honeycomb plug within said hole so that said boundary walls and perimeter walls do not contact each other so as to form an open seam channel which is free of said boundary walls and perimeter walls, said seam channel having channel a width defined by the distance between said plug perimeter and said hole boundary, a channel depth defined by the plug depth at said plug perimeter and the panel depth at said hole boundary and a channel circumference;

E) locating a honeycomb seam in said open seam channel to adhesively bond said acoustic honeycomb panel to said acoustic honeycomb plug, said honeycomb seam comprising:
 a) a honeycomb support that is in the shape of a ribbon having a support thickness defined by the distance between a first support edge and a second support edge, a support width defined by the distance between a first support side and a second support side and a support circumference wherein the support thickness, support width and support circumference are such that said honeycomb support is located within said open seam channel, said honeycomb support comprising a plurality of support walls that extend between said first and second support edges, said support walls defining a plurality of support honeycomb cells wherein each of said support honeycomb cells has a cross-sectional area measured perpendicular to said support walls; and
 b) an adhesive located in said support honeycomb cells, said adhesive being present in an amount that is sufficient to fill said open seam channel and thereby bond said plug perimeter to said panel boundary.

13. A method for repairing a damaged acoustic honeycomb panel according to claim 10 wherein said damaged acoustic honeycomb panel forms part of an acoustic treatment for a jet engine.

14. A plugged acoustic honeycomb panel comprising:
A) an acoustic honeycomb panel comprising a first panel edge and a second panel edge, said acoustic honeycomb panel further comprising a plurality of panel walls that extend between said first and second panel edges, said panel walls defining a plurality of panel acoustic honeycomb cells wherein each of said panel acoustic honeycomb cells has a cross-sectional area measured perpendicular to said panel walls and a panel depth defined by the distance between the first and second panel edges, said acoustic honeycomb panel further comprising acoustic septa located within said plurality of panel acoustic honeycomb cells, said acoustic honeycomb panel comprising a plurality of boundary walls having end portions which surround a hole extending between the first and second panel edges, said hole having a boundary defined by the end portions of said boundary walls;

B) an acoustic honeycomb plug comprising a first plug edge and a second plug edge, said acoustic honeycomb plug further comprising a plurality of plug walls that extend between said first and second plug edges of, said plug walls defining a plurality of plug acoustic honeycomb cells wherein each of said plug acoustic honeycomb cells has a cross-sectional area measured perpendicular to said walls and a plug depth defined by the distance between said first and second plug edges, said acoustic honeycomb plug further comprising acoustic septa located within said plurality of plug acoustic honeycomb cells, said acoustic honeycomb plug comprising a plurality of plug perimeter walls having end portions which form a plug perimeter that is defined by said end portions of the plug perimeter walls, said acoustic honeycomb plug being located within said hole so that said boundary walls and perimeter walls do not contact each other so as to form an open seam channel which is free of said boundary walls and perimeter walls, said open seam channel having a channel width defined by the distance between said plug perimeter and said hole boundary, a channel depth defined by the plug depth at said plug perimeter and the panel depth at said hole boundary and a channel circumference; and C) a honeycomb seam that is located in said open seam channel to adhesively bond said acoustic honeycomb panel to said acoustic honeycomb plug, said honeycomb seam comprising:
 a) a honeycomb support that is in the shape of a ribbon having a support thickness defined by the distance between a first support edge and a second support edge, a support width defined by the distance between a first support side and a second support side and a support circumference wherein the support thickness, support width and support circumference are such that said honeycomb support is located within said open seam channel, said honeycomb support comprising a plurality of support walls that extend between said first and second support edges, said support walls defining a plurality of support honeycomb cells wherein each of said support honeycomb cells has a cross-sectional area measured perpendicular to said support walls; and
 b) an adhesive located in said support honeycomb cells, said adhesive being present in an amount that is sufficient to fill said open seam channel and thereby bond said plug perimeter to said panel boundary.

15. A plugged acoustic honeycomb panel according to claim 14 wherein said honeycomb seam is a single of ribbon having a head end and a tail end wherein said head end and tail end are located next to each other.

16. A plugged acoustic honeycomb panel according to claim 14 wherein the open seam channel width is from 0.35 inch to 0.50 inch.

17. A plugged acoustic honeycomb panel according to claim 14 wherein the open seam channel depth is from 0.25 inch to 3.0 inches.

18. A plugged acoustic honeycomb panel according to claim 14 wherein the open seam channel circumference is at least 10 inches.

19. A plugged acoustic honeycomb panel according to claim 14 wherein said acoustic honeycomb panel forms part of an acoustic treatment for a jet engine.

20. A plugged acoustic honeycomb panel according to claim 14 wherein said adhesive is a polyamide-imide adhesive.

21. A plugged acoustic honeycomb panel according to claim 20 wherein said acoustic honeycomb panel is made from a composite material.

\* \* \* \* \*